Patented Apr. 8, 1930

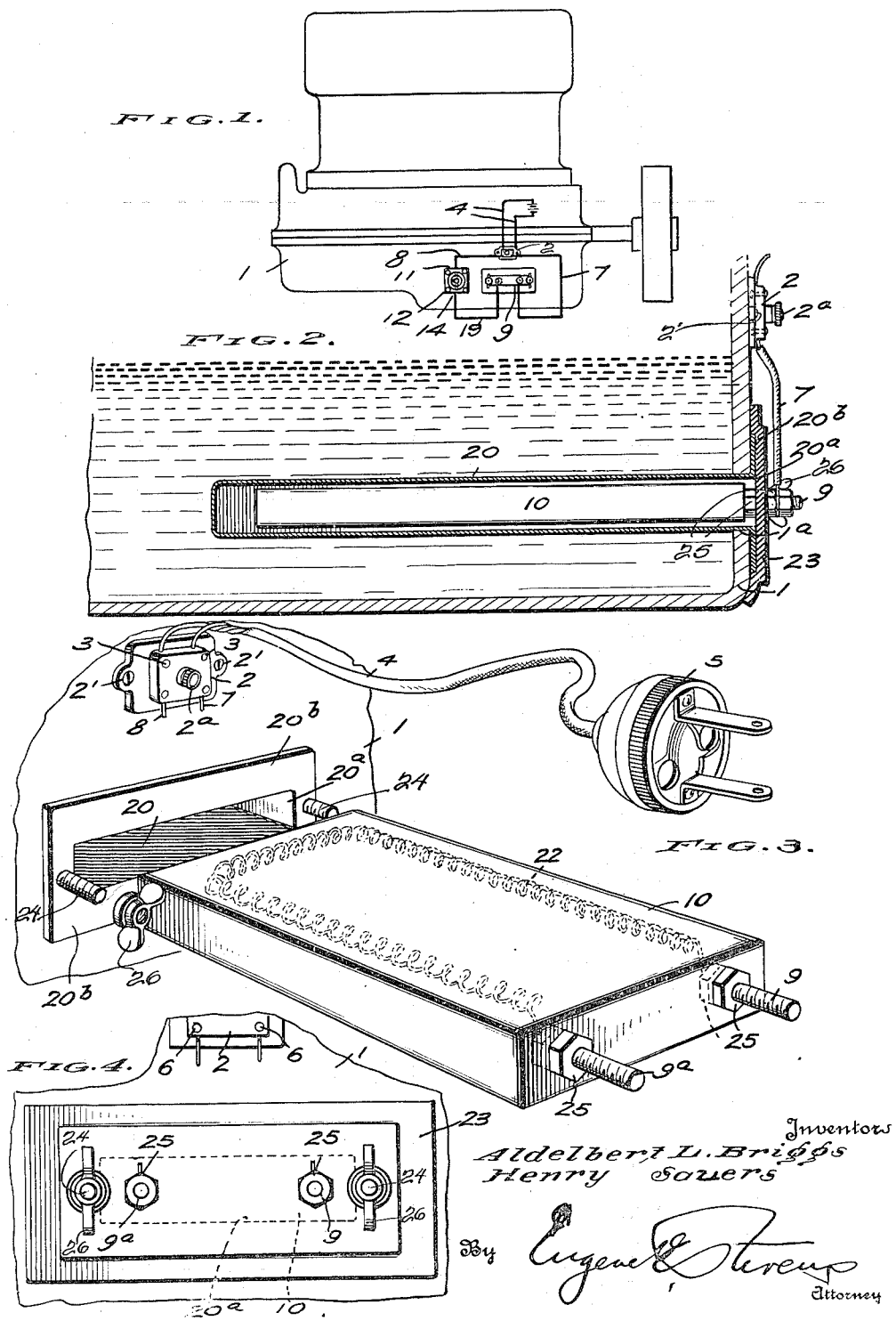

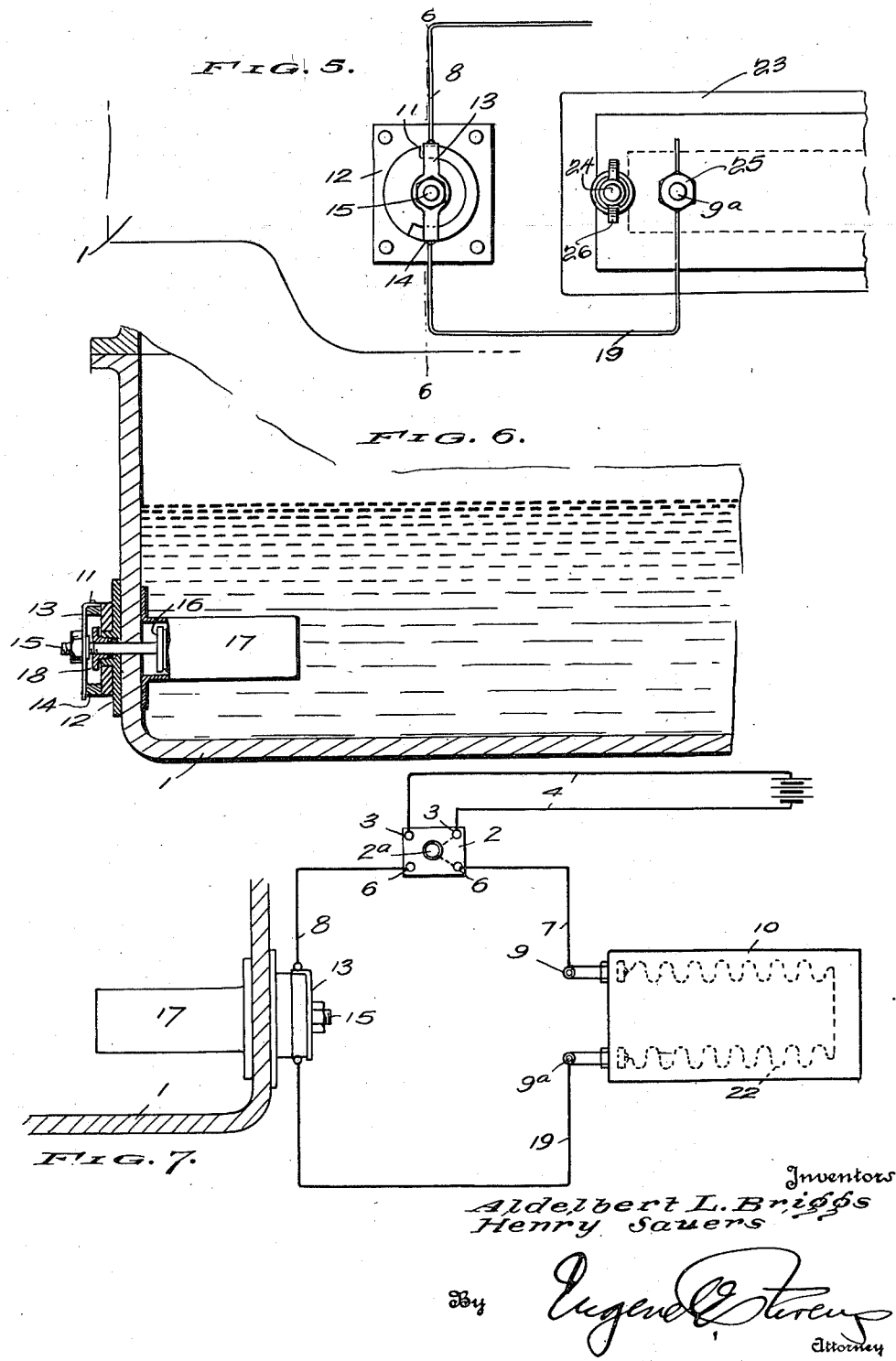

1,754,080

UNITED STATES PATENT OFFICE

ADELBERT L. BRIGGS AND HENRY SAUERS, OF ESCANABA, MICHIGAN

CRANK-CASE HEATER FOR MOTOR VEHICLES AND THE LIKE

Application filed April 5, 1929. Serial No. 352,860.

Our invention relates to improvements in crank-case heaters for motor vehicles and the like.

Briefly stated, the invention contemplates a device of this kind which is very simple in construction, highly efficient in practical use for maintaining the oil in the crank-case, in a fluid state, (to assure easy starting in cold weather), and which can be readily applied to all types of internal combustion engine crank-cases without the necessity of removing the crank-case from the motor.

The invention also has for an object to provide in a device of this kind a novel assembly of heating unit and carrier therefor whereby the heating unit can be readily removed,—the nature of the crank-case and heating unit-carrier assembly being such as to prevent oil leakage.

Another object of the invention resides in the provision of novel means for confining the heating unit in place within the heating unit carrier.

As still further objects, the invention aims to furnish a fuse-controlled current supply line and a thermostatically operable control switch therefor responsive to the crank case oil temperature.

The invention also resides in certain novel features of construction, combination and arrangement of the various parts and in modes of operation which will be readily understood and appreciated by those skilled in the art upon reference to the accompanying drawing in connection with the following descriptive matter.

While the preferred embodiment of the invention is disclosed and claimed herein, yet it will be understood that various changes and departures can be made in and from the disclosed embodiment of the invention without, however, departing from the spirit and scope of the subject matter claimed hereinafter.

In the drawings—

Figure 1 is a side elevational view illustrating the application of the invention to engine crank-case of a motor vehicle,—the wiring being shown diagrammatically;

Figure 2 is a fragmentary vertical sectional view drawn to enlarged scale;

Figure 3 is a group perspective view illustrating a fragment of the crank case and certain of the elements of the installation applied thereto,—the heating element being shown removed from its casing;

Figure 4 is a fragmentary side elevational view of the crank case and depicting the heating element and its confining closure in place;

Figure 5 is a view similar to Figure 4 but showing the thermostatic control switch;

Figure 6 is a sectional view taken on the line 6—6 of Figure 5; and

Figure 7 is a wiring diagram.

Referring specifically to the drawing, wherein the same reference characters have been used to designate the same parts in all views, numeral 1 denotes the engine crank-case, while 2 indicates a fibre fuse block, which is bolted to the crank-case, as shown at 2'. Fuse block 2 has binding posts 3, 6 as shown.

From the binding posts 3 lead the wires 4 to the plug 5, which is adapted to be plugged into the 110 A. C. or D. C. electric light circuit of the garage. Of course the storage battery of the car may be availed of as the source of current supply as suggested in Figure 1.

The block 2 is shown as provided with a plug fuse 2ª,—the socket of which is connected with the individual binding posts 3, 6, at one side of the block 2.

From the binding posts 6 lead the insulated lead wires 7, 8,—the former being attached to the binding post 9 of heating unit 10, while the wire 8 is attached to the post or contact 11 of a switch block 12. A spring metal bridge piece 13 is attached to post 11 and is adapted to be actuated to and from contact with the other switch block contact post 14 by means of the reciprocal plunger 15 of the thermostat 16 within the fluid tight casing 17.

This casing 17 is brazed or welded to the crank case 1 and projects thereinto as shown in Figure 6,—the plunger 15 working through a suitable packing gland 18 carried by switch block 12. Switch block 12 is suitably secured to the outer side of the crank case.

From switch block contact post 14 leads the wire 19 to the binding post 9ᵃ of the heating unit 10.

The heating unit 10 is adapted to be inserted into an elongated flat rectangular casing 20 through its end opening 20ᵃ. The casing 20 is insertable through a side slot 1ᵃ cut in the crank case 1. The outer end of the casing 20 is provided with a marginal flange 20ᵇ which is adapted to be brazed to the outer wall surface of the crank-case so as to provide a rigid and leak-proof attachment of the casing 20 with the crank-case.

It is to be noted that the casing 20 can be applied, as above described, without removing the crank-case from the engine and by simply cutting the slot 1ᵃ in the side of the crank-case, as indicated.

The heating unit 10, per se, forms no part of the present invention. Suffice it to say that the same comprises generally a block having covered grooves containing the heating coil 22 the ends of which are connected with the binding posts 9, 9ᵃ which project through the end of the blocks.

The heating unit 10 is confined in place by means of a fiber cover 23 which is secured to the side of the crank-case by means of studs 24 projecting from the crank case and receiving wing nuts 26. The fiber cover has holes through which the binding posts 9, 9ᵃ extend,—there being provided nuts 25 on each binding post on either side of the fiber cover.

From the foregoing description taken in connection with the accompanying drawings, it will be apparent that the car equipped with my invention may be put in a garage, the plug 5 inserted in a socket and left with the assurance that the crank-case temperature will be maintained at a temperature sufficiently high to preserve the fluidity of the oil,—the thermostat cutting on the current when the temperature reaches a predetermined low point and shutting it off at a predetermined high point.

Having thus described our invention, what we claim as new and desire to secure by Letters Patent is:

1. In the combination of a crank-case and heater, a casing insertible through a slot in the crank-case, the casing having an open end, a marginal laterally extending flange at the open end of said casing and adapted to abut the wall of the crank-case against the slot therein for limiting insertion of the casing into the crank-case, means for sealingly connecting the casing to said crank-case through the medium of said marginal flange, a heating unit insertible into said casing through the open end thereof, a closure for the open end of said casing, and means for supplying electric current to said heating unit.

2. The combination set forth in claim 1, and said marginal flange being brazed to the crank-case.

3. The combination set forth in claim 1, and said electric supply means including a fuse and carrier block therefor secured to said crank-case.

4. The combination set forth in claim 1, said heating element having terminals, and said closure being of insulating material and having holes through which said terminals are adapted to project whereby to keep said terminals separated.

5. In a crank-case heater, a casing carried by the crank-case below the oil level therein, a heating element insertible into said casing from the outside of the crank-case, means for confining said heating element in said casing, a fuse carrying block, a switch block, and a thermostat all carried by said crank-case, the thermostat extending into the crank-vase below the oil level thereof, the switch block having contacts, current supply means for said heating element, one of the lines of said supply means leading through said fuse block, one of the lines leading to one contact of the switch block and from the other contact to the heating element, and a contact bridging element carried by the thermostat and adapted to bridge the switch bridge contacts.

In testimony whereof we affix our signatures.

ADELBERT L. BRIGGS.
HENRY SAUERS.